US005839535A

United States Patent [19]
Arai

[11] Patent Number: 5,839,535
[45] Date of Patent: Nov. 24, 1998

[54] FRONT WHEEL- AND REAR WHEEL-DRIVE VEHICLE AND APPARATUS FOR DETECTING COEFFICIENT OF FRICTION ON ROAD SURFACE

[75] Inventor: Kentarou Arai, Saitama-ken, Japan

[73] Assignee: Honda Giken Koygo Kabushiki Kaisha

[21] Appl. No.: 633,643

[22] Filed: Apr. 17, 1996

[30] Foreign Application Priority Data

May 1, 1995 [JP] Japan ..................................... 7-107511

[51] Int. Cl.⁶ ................................................. B60K 28/16
[52] U.S. Cl. ........................... 180/197; 701/81; 180/65.2
[58] Field of Search ..................................... 180/197, 247, 180/233, 65.2, 65.6, 65.4, 305; 701/80, 81

[56] References Cited

U.S. PATENT DOCUMENTS

| | | | |
|---|---|---|---|
| 3,853,194 | 12/1974 | Peterson | 180/65.2 |
| 4,470,476 | 9/1984 | Hunt | 180/65.2 |
| 4,923,025 | 5/1990 | Ellers | 180/65.2 |
| 5,126,942 | 6/1992 | Matsuda | 364/426.02 |
| 5,164,903 | 11/1992 | Lin et al. | 364/426.03 |
| 5,212,640 | 5/1993 | Matsuda | 364/424.03 |
| 5,225,982 | 7/1993 | Ito et al. | 364/426.03 |
| 5,249,641 | 10/1993 | Sakata | 180/197 |
| 5,265,020 | 11/1993 | Nakayama | 364/424.05 |
| 5,265,694 | 11/1993 | Yamashita | 180/197 |
| 5,492,192 | 2/1996 | Brooks et al. | 180/165 |

FOREIGN PATENT DOCUMENTS

| | | |
|---|---|---|
| 11 36 215 | 9/1962 | Germany . |
| 35 42 059 C1 | 6/1987 | Germany . |
| 36 36 260 A1 | 5/1988 | Germany . |
| 38 30 766 A1 | 5/1990 | Germany . |
| 38 37 908 C2 | 11/1990 | Germany . |
| 39 40 172 A1 | 6/1991 | Germany . |
| 42 25 683 A1 | 2/1994 | Germany . |
| 43 12 949 A1 | 10/1994 | Germany . |
| 44 02 152 C1 | 4/1995 | Germany . |
| 295 05 911.7 | 7/1995 | Germany . |
| 3-159502 | 7/1991 | Japan . |
| 5-8639 A | 1/1993 | Japan . |

Primary Examiner—Brian L. Johnson
Assistant Examiner—Bridget Avery
Attorney, Agent, or Firm—Armstrong, Westerman, Hattori, McLeland & Naughton

[57] ABSTRACT

Either the front wheels or the rear wheels of a front wheel- and rear wheel-drive vehicle are driven by an engine and the other thereof are driven by an electric motor. A detecting device detects a coefficient of friction on a road surface during running of the vehicle. Control circuit controls to operate the electric motor when the vehicle is subsequently started in a condition in which the coefficient of friction on the road surface is equal to or smaller than a predetermined value. The detecting device for detecting the coefficient of friction on the road surface is made up of a section for detecting the driving force of wheels to be driven by the engine, a section for detecting a slip ratio of the wheels, and a section for obtaining the coefficient of friction on the road surface based on a correlation between the driving force and the slip ratio.

5 Claims, 3 Drawing Sheets

FRONT WHEEL- AND REAR WHEEL-DRIVE VEHICLE AND APPARATUS FOR DETECTING COEFFICIENT OF FRICTION ON ROAD SURFACE

BACKGROUND OF THE INVENTION

1. Field of the Invention

The present invention relates to a front wheel- and rear wheel-drive vehicle in which either the front wheels and the rear wheels are driven by an engine and the other thereof are driven by an electric motor, and also relates to an apparatus for detecting a coefficient of friction on a road surface to be applied to this vehicle.

2. Description of the Related Art

Conventionally, there is known this kind of vehicle in which an alternating-current (AC) motor is used as an electric motor and in which the electric motor is made operable over an entire range of vehicle speed through an inverter control (see Japanese Published Unexamined Patent Application No. 159502/1991).

In order to cover the entire range of the vehicle speed as in the above-described prior art, it is necessary to employ an electric motor of a large output. In addition, an inverter circuit becomes necessary, resulting in a higher cost.

By the way, if an arrangement is made to operate the electric motor only at the time of starting the vehicle in order to limit the purpose of using the electric motor to the assistance of the vehicle's starting, it is possible to use such an inexpensive direct-current (DC) brush motor as is used as a self-starting motor or the like. However, if the DC brush motor is operated always at the time of starting the vehicle, the durability of the brush will become a problem.

In order to deal with this kind of disadvantages, the following arrangement may be considered. Namely, there is provided a switch which is operated when the driver has considered the road to be slippery, and the electric motor is operated when the vehicle starts in a condition in which the switch is switched on, or else, the electric motor is operated when the wheels to be driven by the engine give rise to slipping at the time of starting the vehicle.

However, the former system is troublesome because the operation of the switch becomes necessary. In the latter system, on the other hand, the electric motor is started to operate after the wheels to be driven by the engine have started rotation. It has therefore a disadvantage in that the response in the starting assistance becomes poor.

SUMMARY OF THE INVENTION

In view of the above-described disadvantages, the present invention has an object of providing an apparatus for detecting a coefficient of friction on a road surface during running of a vehicle, as well as a front wheel- and rear wheel-drive vehicle in which, by using the above-described apparatus, the starting assistance on a road of low coefficient of friction can be automatically obtained with a good response.

In order to attain the above object, the present invention is a front wheel- and rear wheel-drive vehicle in which either the front wheels or the rear wheels are driven by an engine and the other thereof are driven by an electric motor, the vehicle comprising: a detecting device for detecting a coefficient of friction on a road surface during running of the vehicle; and control means for controlling to operate the electric motor when the vehicle subsequently starts in a condition in which the coefficient of friction on the road surface is equal to or smaller than a predetermined value; wherein the detecting device for detecting the coefficient of friction on the road surface comprises: means for detecting a driving force of wheels to be driven by the engine; means for detecting a slip ratio of the wheels; and means for obtaining the coefficient of friction on the road surface based on a correlation between the driving force and the slip ratio.

The slip ratio of the wheels varies with the driving force of the wheels even if the coefficient of friction on the road surface is constant. Therefore, the coefficient of friction cannot be detected by the slip ratio alone. However, as in the present invention, by making the driving force and the slip ratio as parameters, the friction coefficient on the road surface can be accurately detected.

When the vehicle starts again after having once stopped during running on a road surface of a low friction coefficient such as a snowy road or the like, it is known in advance that the friction coefficient on the road surface is low. Therefore, before the wheels to be driven by the engine slip, the electric motor can be operated to thereby assist the starting of the vehicle with a good response.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
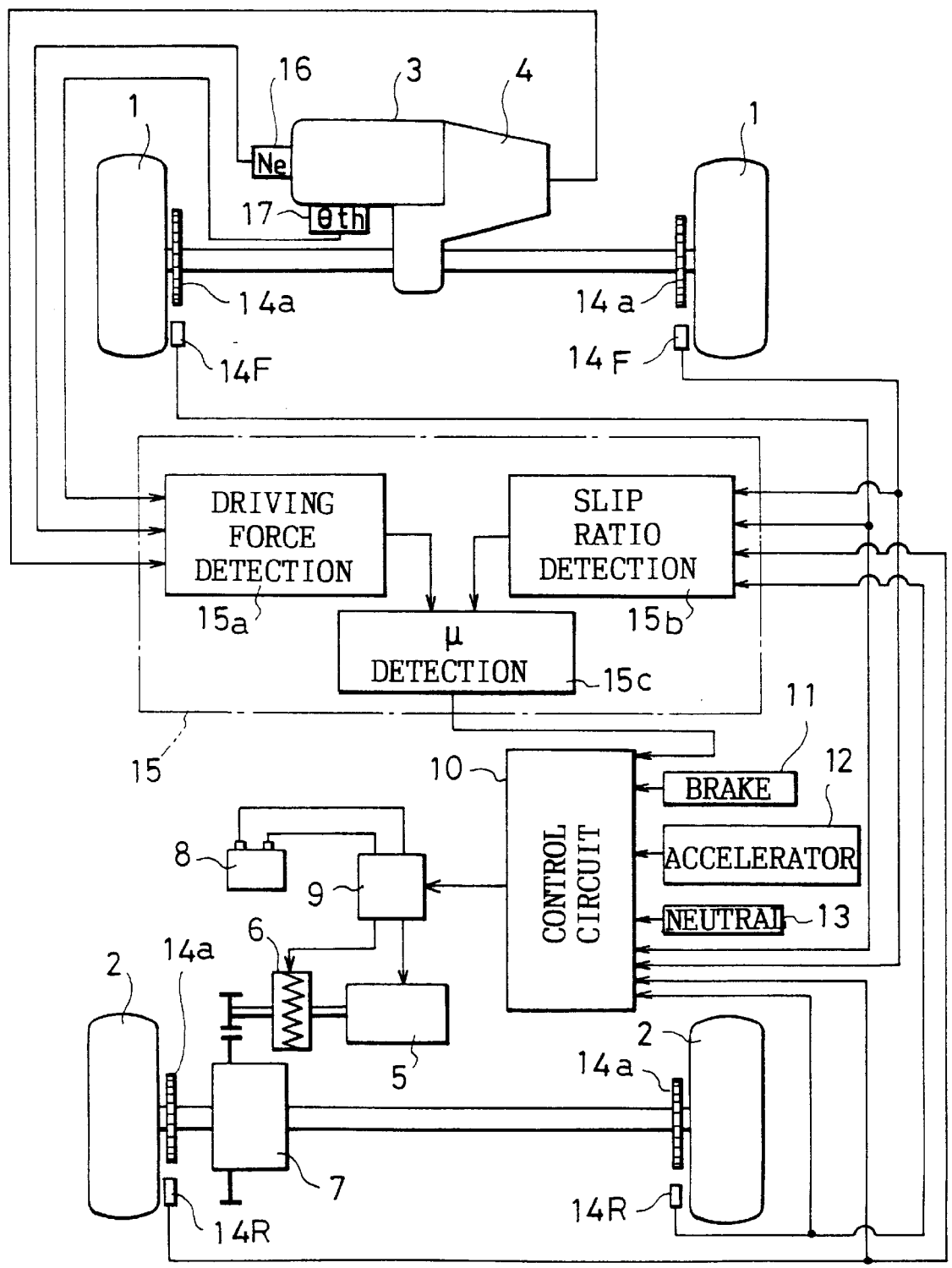
FIG. 1 is a skeleton diagram showing an embodiment of the present invention.

The embodiment in FIG. 1 shows a four-wheeled vehicle having a pair of front wheels 1 and a pair of rear wheels 2, respectively. The pair of right and left front wheels 1, 1 are driven by an engine 3 via a transmission 4. The pair of right and left rear wheels 2, 2 are driven by an electric motor 5 via a clutch 6 and a differential gear 7.

The electric motor 5 is constituted as a direct-current (DC) brush motor and is connected to a vehicle-mounted battery 8 via a switching circuit 9 in which is built a circuit for switching between forward running and reverse running. The switching circuit 9 is controlled to be switched on and switched off by a signal from the control circuit 10. When the switching circuit 9 is switched on, the electric motor 5 is operated and also the clutch 6 is engaged so that the rear wheels 2 can be driven by the electric motor 5. The circuit for switching between forward running and reverse running, that is built in the switching circuit 9, is controlled for switching in interlocking relationship with a shifting lever inside a compartment of the vehicle.

The control circuit 10 is made up of a microcomputer which receives the following input signals: i.e., a signal of a brake switch 11 for detecting whether a brake is off; a signal of an accelerator pedal switch 12 for detecting whether an accelerator pedal is on (i.e., depressed); a signal of a transmission sensor 13 for detecting whether the transmission 4 is in a neutral condition or not, e.g., a shift lever position sensor in an automatic transmission and a clutch switch in a manual transmission; and signals of wheel speed sensors 14R for detecting the revolution speeds of the rear wheels 2 in cooperation with pulser gears 14a which are mounted on the rear wheels 2. Further, there is provided a μ detecting device 15 for detecting, during running of the vehicle, a coefficient of friction μ on the road surface so that a signal from the μ detecting device 15 can also be inputted into the control circuit 10.

The μ detecting device 15 is made up of a driving force detecting section 15a for detecting the driving force of the front wheels 1, a slip ratio detecting section 15b for detecting the slip ratio of the front wheels 1, and a μ detecting section 15c for detecting the coefficient of friction μ on the road surface based on a correlation between the driving force and the slip ratio of the front wheels 1.

The driving force detecting section 15a receives the following input signals: i.e., a signal of a sensor 16 for detecting the revolution speed Ne of the engine 3; a signal of a sensor 17 for detecting a throttle opening degree θth of the engine 3; and a signal indicating the present established speed stage of the transmission 4. An engine output torque is derived or obtained from Ne and θth through map searching or the like. From this output torque and a gear ratio of the established speed stage, the driving force of the front wheels 1 is computed. By the way, there is a vehicle having mounted thereon a system in which, based on the intention of a driver to be determined from an amount of depression of the accelerator pedal as well as the present driving conditions, the throttle opening degree, the fuel injection amount and the speed stage are electronically controlled. In this vehicle, a target value of the driving force of the wheels to be driven by the engine is computed by a control unit for the system. The engine and the transmission are thus controlled so that the driving force becomes the target value. Therefore, this control unit may be used to serve the dual purpose of the driving force detecting section.

The slip ratio detecting section 15b receives the following input signals: i.e., signals of wheel speed sensors 14F which detect the revolution speeds of the front wheels 1 in cooperation with pulser gears 14a mounted on the front wheels 1; and signals of the wheel speed sensors 14R which detect the revolution speeds of the rear wheels 2. Here, during running of the vehicle, the rear wheels 2 are rotated as driven wheels at a speed equivalent to the vehicle speed. Therefore, the slip ratio of the front wheels 1 as the driving wheels can be computed from the difference in revolution speeds between the front wheels 1 and the rear wheels 2. This computation is performed in the slip ratio detecting section 15b to thereby detect the slip ratio.

Figure 3:
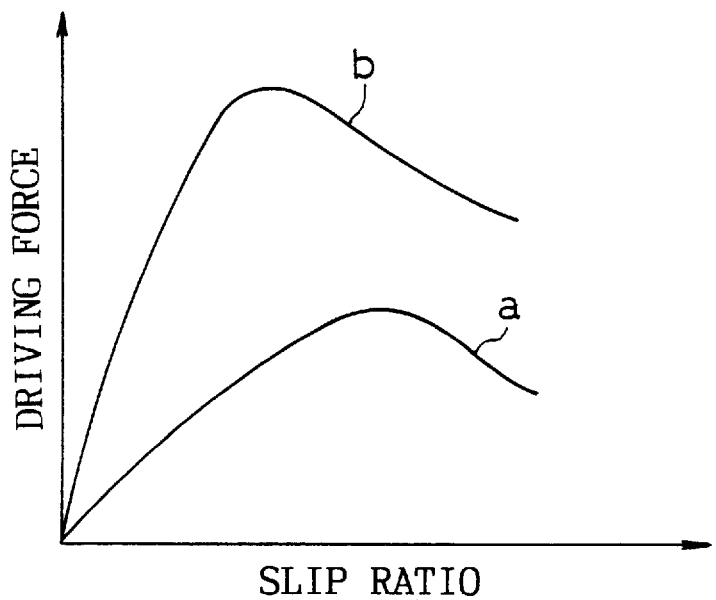
FIG. 3 is a graph showing the correlation between a driving force and a slip ratio.

The μ detecting section 15c receives inputs of a signal from the driving force detecting section 15a and a signal from the slip ratio detecting section 15b. Here, the correlation between the driving force and the slip ratio of the front wheels 1 will be as shown in a curve "a" in FIG. 3 in case the coefficient of friction μ on the road surface is low, and will be as shown in a curve "b" in case the coefficient of friction μ on the road surface is high. Then, in the μ detecting section 15c the coefficient of friction μ on the road surface is detected through map searching or the like based on the correlation between the driving force and the slip ratio. The detected value of coefficient of friction μ is transmitted to the control circuit 10.

Figure 2:
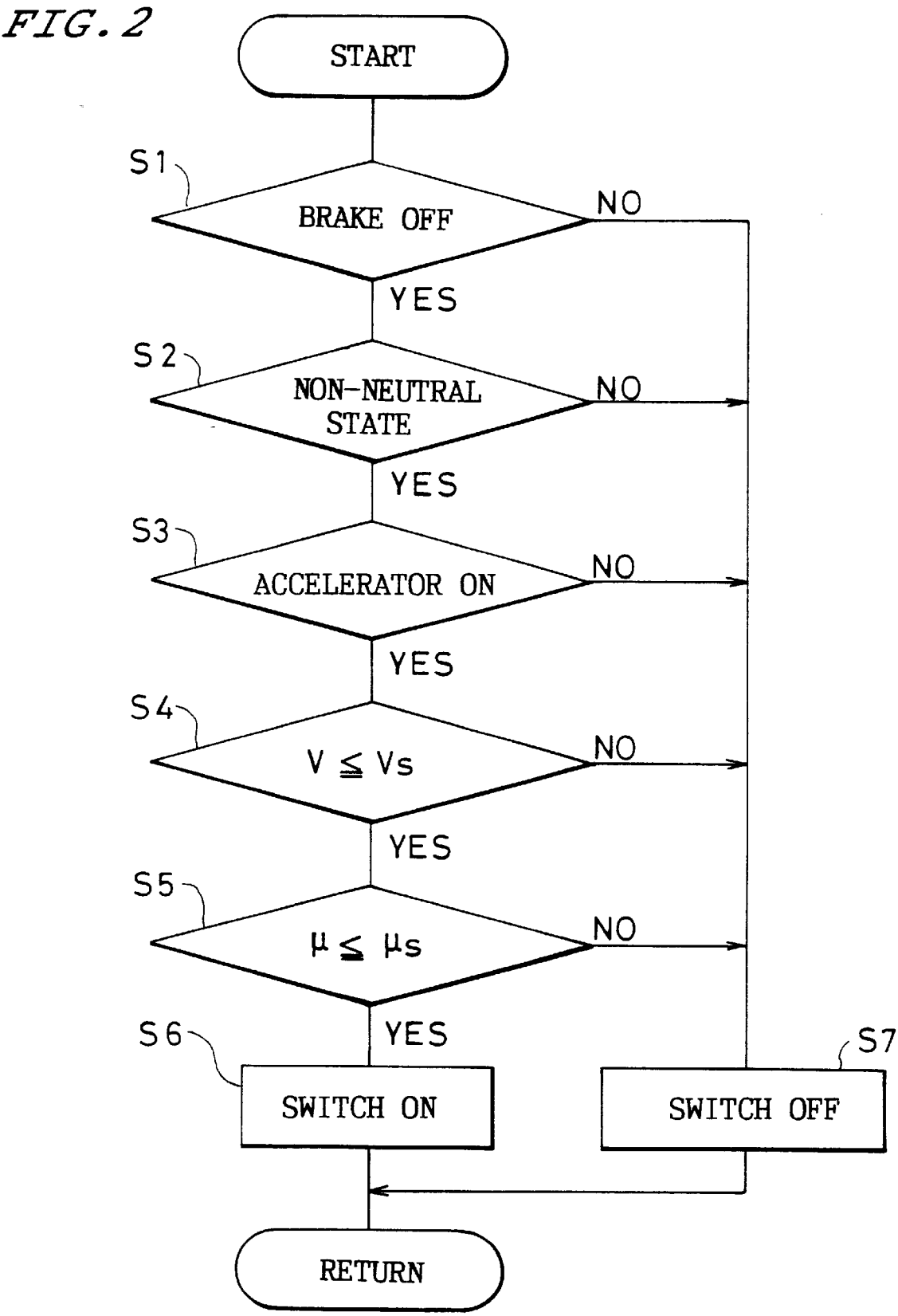
FIG. 2 is a flow diagram showing a control program of an electric motor.

The control process in the control circuit 10 is shown in FIG. 2. When the following four conditions are met, the vehicle is considered to be in a state of being started, the four conditions being that the brake (inclusive of a parking brake and a side brake) is off or released (S1), that the transmission is in a non-neutral condition (S2), that the accelerator pedal is on (i.e., depressed) (S3), and that the revolution speeds of the rear wheels (vehicle speed) V are equal to or smaller than a predetermined value Vs (S4). When the vehicle is considered to be in a state of being started, a determination is made as to whether the value of coefficient of friction μ detected before stopping of the vehicle is equal to or smaller than a predetermined value μs (S5). When μ≦μs, the switching circuit 9 is switched on (S6). When the vehicle is not in a state of being started because any one of the above four conditions is not met or, if μ>μs even if the vehicle is in a state of being started, the switching circuit 9 is switched off (S7). In this manner, when the vehicle is started on a road of low coefficient of friction μ, the electric motor 5 is operated from the beginning of the starting of the vehicle to thereby drive the rear wheels 2. As a result, the starting of the vehicle is assisted with a good response. Further, it becomes only on the occasion of starting the vehicle on a road of low coefficient of friction μ that the electric motor 5 is operated. It follows that there will be no problem in durability even if an inexpensive DC brush motor is used as the electric motor 5.

By the way, at the time of applying the brake, the coefficient of friction μ on the road surface cannot accurately be detected. As a solution, a determination processing is made in step S5 based on the value of coefficient of friction μ which was detected just before applying the brake. In addition, in the present embodiment, the control circuit 10 receives input signals from the revolution speed sensors 14F for the front wheels, aside from the signals from the revolution speed sensors 14R for the rear wheels. Though not illustrated in FIG. 2, a determination is made as to whether the vehicle started well without giving rise to slipping of the front wheels 1. The values of the above-described Vs and μs are thus arranged to be changeable through a learning control.

An explanation has so far been made about an embodiment in which the present invention is applied to a four-wheel drive vehicle whose front wheels 1 are driven by the engine 3 and the rear wheels 2 are driven by the electric motor 5. The present invention may of course be similarly applied to a vehicle in which the rear wheels are driven by an engine and the front wheels are driven by an electric motor.

As can be seen from the above explanations, according to the present invention, the purpose of using the electric motor is limited to the assistance in starting the vehicle on the road of low coefficient of friction μ. Therefore, even if an inexpensive DC brush motor is used as the electric motor, there is no problem in the durability. In addition, the assistance in starting of the vehicle can be automatically made with a good response, with the result that the vehicle can be used with good maneuverability or operability. Further, the coefficient of friction μ on the road surface can be detected during running of the vehicle and, therefore, the control based on the coefficient of friction μ becomes possible.

It is readily apparent that the above-described front wheel- and rear wheel-drive vehicle and apparatus for detecting a coefficient of friction on a road surface meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A front wheel- and rear wheel-drive vehicle in which either the front wheels or the rear wheels are driven by an engine and the other thereof are driven by an electronic motor, said vehicle comprising:

a detecting device for detecting a coefficient of friction on a road surface during running of the vehicle; and control means for controlling said electric motor when the vehicle subsequently starts in a condition in which the coefficient of friction on the road surface is equal to or smaller than a predetermined value, wherein said detecting device for detecting the coefficient of friction on the road surface comprises: means for detecting a driving force of wheels to be driven by said engine; means for detecting a slip ratio of said wheels; and means for obtaining the coefficient of friction on the road surface based on a correlation between the driving force and the slip ratio.

2. A front wheel- and rear wheel-drive vehicle according to claim 1, wherein said electric motor is a direct-current brush motor.

3. A front wheel- and rear wheel-drive vehicle according to claim 1, wherein said coefficient of friction to be compared with said predetermined value is a coefficient of friction detected right before applying a brake.

4. A front wheel- and rear wheel-drive vehicle according to claim 1, wherein said predetermined value is changed through a learning control by determining whether wheels to be driven by said engine slipped when the vehicle started.

5. An apparatus for detecting a coefficient of friction on a road surface comprising:

means for detecting a driving force of wheels to be driven by an engine of a vehicle;

means for detecting a slip ratio of said wheels; and means for obtaining the coefficient of friction on the road surface based on a correlation between the driving force and the slip ratio, wherein the coefficient of friction on the road surface is capable of being inputted into a control device that controls a motor that in turn controls other wheels based on the coefficient of friction, wherein the wheels driven by the engine are different from the other wheels controlled by the motor.

* * * * *

UNITED STATES PATENT AND TRADEMARK OFFICE
CERTIFICATE OF CORRECTION

PATENT NO.: 5,839,535
DATED      : November 24, 1998
INVENTOR  : Kentarou ARAI

It is certified that error appears in the above-identified patent and that said Letters Patent is hereby corrected as shown below:

Column 5, line 4; in Claim 1 after "an" change "electronic" to --electric--.

Signed and Sealed this

Eleventh Day of May, 1999

Attest:

Q. TODD DICKINSON

*Attesting Officer*    *Acting Commissioner of Patents and Trademarks*

UNITED STATES PATENT AND TRADEMARK OFFICE
CERTIFICATE OF CORRECTION

PATENT NO.: 5,839,535
DATED : November 24, 1998
INVENTOR : Kentarou ARAI

It is certified that error appears in the above-identified patent and that said Letters Patent is hereby corrected as shown below:

Column 5, line 4; in Claim 1 after "an" change "electronic" to --electric--.

Signed and Sealed this

Twenty-first Day of September, 1999

Attest:

Q. TODD DICKINSON

*Attesting Officer*     *Acting Commissioner of Patents and Trademarks*